United States Patent [19]

Tantlinger

[11] 3,951,454

[45] Apr. 20, 1976

[54] CANTILEVERED PASSENGER SEAT FOR TRANSIT VEHICLE

[75] Inventor: Keith W. Tantlinger, Rancho Santa Fe, Calif.

[73] Assignee: Rohr Industries, Inc., Chula Vista, Calif.

[22] Filed: June 5, 1974

[21] Appl. No.: 476,652

Related U.S. Application Data

[63] Continuation of Ser. No. 299,975, Oct. 13, 1972, which is a continuation of Ser. No. 77,109, Oct. 1, 1970.

[52] U.S. Cl. .............................. 297/452; 297/183; 297/232
[51] Int. Cl.² ............................................. A47C 7/02
[58] Field of Search ............ 297/DIG. 2, 183, 445, 297/450, 451, 452, 456, 232

[56] References Cited
UNITED STATES PATENTS

| | | |
|---|---|---|
| 3,049,377 | 8/1962 | Asaro et al. ................ 297/456 |
| 3,139,307 | 6/1964 | Hawley et al. ................ 297/DIG. 2 |
| 3,482,875 | 12/1969 | Barecki et al. ................ 297/445 |
| 3,574,394 | 4/1971 | Von Pongracz ................ 297/158 |
| 3,576,059 | 4/1971 | Pearson ................ 297/DIG. 2 |
| 3,619,006 | 11/1971 | Barecki ................ 297/450 |
| 3,630,566 | 12/1971 | Barecki ................ 297/450 |
| 3,632,159 | 1/1972 | Barecki ................ 297/451 |
| 3,642,322 | 2/1972 | Bilancia ................ 297/445 |

Primary Examiner—James T. McCall
Attorney, Agent, or Firm—Patrick J. Schlesinger

[57] ABSTRACT

A unitary sandwich panel having a polyurethane core and aluminum facing sheets, forms bottom and back support portions of a seat cantilevered at one end thereof from a transit vehicle wall or other vertical support. Cushions, arm rests, and a molded back cover are attached to the panel.

12 Claims, 3 Drawing Figures

CANTILEVERED PASSENGER SEAT FOR TRANSIT VEHICLE

This is a continuation of application Ser. No. 299,975, filed Oct. 13, 1972, which is a continuation of application Ser. No. 77,109, filed Oct. 1, 1970.

SUMMARY OF THE INVENTION

This invention relates to a seat and more particularly to a seat that is designed for use in public carriers such as buses, trains, and aircraft.

In accordance with this invention a unitary structure such as a panel, which may consist of a single piece of metal or other rigid material or a sandwich type composite, forms the bottom and back support portions of a seat and is cantilevered at one end thereof from a transit vehicle wall or other vertically extending support. The back and bottom support portions may be made as separate panels suitably joined together and cantilevered at one end thereof. Preferably cushions, arm rests, and a molded shell are attached to the panel.

DESCRIPTION OF THE DRAWINGS

FIG. 3 is an enlarged, fragmentary, sectional view taken along line 3—3 of FIG. 1.

DETAILED DESCRIPTION

Figure 1:
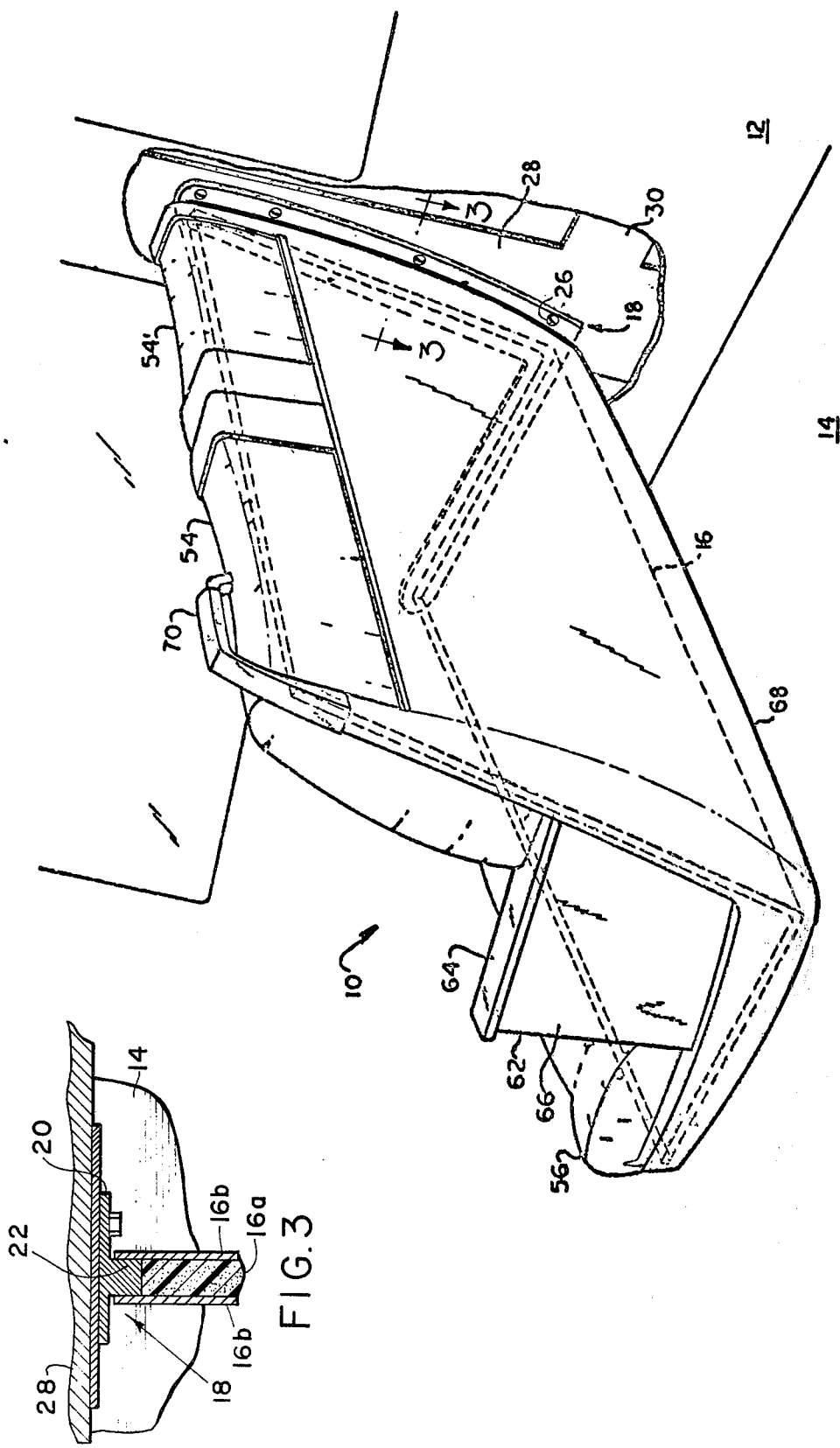
FIG. 1 is a pictorial view of a cantilever seat embodying a preferred embodiment of the present invention.
Figure 2:
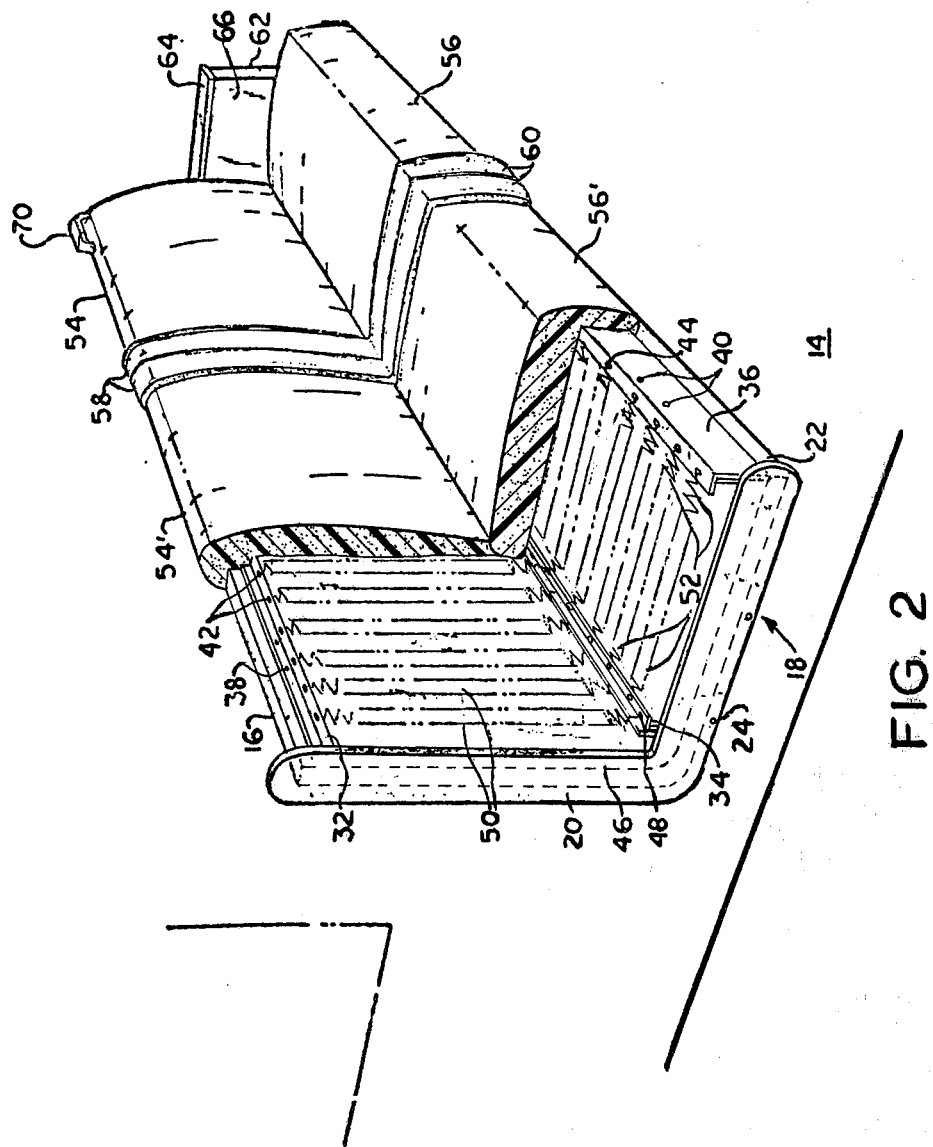
FIG. 2 is a pictorial view of the same seat, taken from the end thereof which is attached to the vehicle wall and certain parts being either removed or broken away in the drawing so that underlying structure can be seen.

Generally designated by reference number 10 in FIG. 1 is a seat which is cantilevered at one end thereof from a wall 12 so that it is spaced from a floor 14. In the same drawing broken lines illustrate a generally L-shaped panel 16 which forms the bottom and back support portions of seat 10 and preferably consists of a foamed polymeric material such as a polyurethane core sandwiched between and bonded to a pair of aluminum facing sheets. As illustrated in FIG. 2 and generally designated therein by reference number 18, a mounting flange extends along the edge of panel 16 which is adjacent wall 12 and comprises a first portion 20 perpendicular to the adjacent surfaces of said panel and a second integral portion 22 extending laterally from said first portion and fixedly disposed between portions of the panel facing sheets which project from the core therebetween.

A three stud support such as disclosed in U.S. Pat. No. 3,802,738, alternatively may be used to support the L-shaped panel 16 in lieu of the mounting flange 16 and its associated frame members.

A plurality of holes 24 extend through portion 20 of flange 18 on one side of said portion 22 thereof, the holes being spaced apart along said flange. Machine screws 26 respectively pass through holes 24 (see FIG. 2) and are engaged within threaded holes in structural members 28, 30 to which the inner panels of wall 12 are attached.

The wall structural members 28 and 30, and configuration and arrangement of the side windows 72 and 74, characterize a rapid transit vehicle known as "BART", wherein the vehicle structure employs aluminum extrusions to provide a high strength-to-weight ratio.

Three elongate spring mounting members 32, 34, 36 are fixedly secured to the mounting flange 18 and to the front side of panel 16 and extend lengthwise thereof in parallel relation with one another, members 32 and 36 being respectively positioned at the upper and lower edges of the panel and member 34 being positioned at the curved portion of the panel which lies between its generally vertical and horizontal sections. Each of the members 32 and 36 comprises a lip which is fastened to panel 16 by rivets 38, 40, a middle portion which projects laterally from the panel, and another lip which is disposed parallel to the panel and which has a plurality of holes 42, 44 spaced apart thereon. Member 34 comprises two lips which are fastened to the panel by rivets 46 and a middle portion which curves outwardly from said panel and which has a plurality of holes 48 spaced apart thereon. The aforesaid holes in the three spring mounting members are respectively aligned so that springs 50, 52 can be mounted in parallel relation with one another by hooking their respective ends on the edges of said holes as illustrated. Two cushions 54, 54', 56, 56' are respectively attached to each set of springs 50, 52, and narrow dividing strips 58, 60 are disposed between the associated pairs of these cushions.

At the free end of panel 16 an end closure (not shown) corresponding to portion 22 of flange 18 is fixedly disposed between portions of the panel facing sheets which project from the panel core, said end closure extending lengthwise of said free end. A support member 62, arm rest 64, and end panel 66 are attached to the aforesaid end closure and to each other by suitable means. Another arm rest assembly is also mounted on flange 18 but is omitted in FIG. 2 so that other components can be seen. A molded plastic shell 68 (see FIG. 1) is attached to panel 16 and covers the back, bottom, and free end thereof, and a handgrip 70 is mounted on the upper corner of the free end of the seat.

As previously mentioned, panel 16 preferably comprises a foam polyurethane core sandwiched between aluminum facing sheets. To provide a strong bond between the facing sheets and the polymeric core, the latter is placed between the former when in the liquid state and then hardened. A strong, rigid panel is formed by use of relatively thin aluminum facing sheets and a core having a thickness of about 2.0 inches.

The disclosed seat is economical to manufacture, strong, light in weight, and easy to remove from its supporting wall for cleaning, repair, or replacement. In addition, since the seat is spaced above a floor, it facilitates cleaning of the latter and has a neat, pleasing appearance. Thus seats in accordance with the invention are particularly well-suited for use in public carriers such as buses, railroad cars, and aircraft. Various modifications in the preferred embodiment which has been described and illustrated can obviously be made without departing from the broad concept of its construction and arrangement, and therefore the scope of the invention must be considered to be limited only by the terms of the appended claims.

Having thus described the invention, what is claimed as new and useful and desired to be secured by U.S. Letters Patent is:

1. A cantilever seat for a transit vehicle comprising an integral L-shaped unitary panel structure having a mounting end and a free end, said panel structure forming the bottom and back support portions of said seat and comprising a pair of facing sheets and a core material sandwiched therebetween; and a mounting flange for fixedly mounting said seat in cantilever manner to a vertical support, said flange extending along said mounting end of said panel structure and comprising a first portion perpendicular to the facing sheets thereof, and a second integral portion extending laterally from said first portion and fixedly disposed between end portions of said facing sheets.

2. A cantilever seat as defined in claim 1 wherein said free end of said panel structure includes a closure member, said closure member including a vertical support member, an arm rest, and an end panel attached thereto.

3. A cantilever seat as defined in claim 1 wherein three elongate spring mounting members are extended between and fixedly attached to said mounting end and free end of said panel structure, said spring mounting members being located respectively at the upper and lower edges of said panel structure and at the portion of said panel structure lying between its generally vertical and horizontal sections and said spring mounting members having a plurality of springs mounted therebetween for supporting loads thereon.

4. A seat as defined in claim 1 wherein said vertical support is a transit vehicle side wall.

5. A seat as defined in claim 4 wherein a flange is fixedly disposed along the end of said panel structure which is adjacent said vehicle side wall, said flange being secured to said side wall to thereby cantilever said seat.

6. A seat as defined in claim 1 wherein said core is bonded to said pair of facing sheets.

7. In a transit vehicle having a floor and side walls, a cantilever seat structure comprising:

a substantially unitary, rigid, upright back panel, formed of a molded core portion sandwiched between two closely conforming facing sheets of a material which is substantially non-elastic and of substantial tensile strength, a substantially unitary, rigid, horizontal seat panel, formed similarly to the back panel, means structurally connecting the lower edge of the seat panel to the rear edge of the back panel to form a seat structure of L cross sectional shape, and to transmit load stresses imposed on the back panel to the seat panel and vice-versa, and means structurally connecting one end of such L shaped seat structure to a vehicle side wall for cantilever support thereby with the seat panel substantially parallel to the vehicle floor and spaced upwardly at seat height therefrom.

8. A cantilever seat as defined in claim 7 wherein at least one element of the wall connecting means is located at an upper portion of the back panel.

9. A cantilever seat as claimed in claim 7 in which the back panel is of structural plastic foam sandwiched between two facing sheets of a material which is substantially non-elastic and of substantial tensile strength.

10. A cantilever seat as defined in claim 9 wherein the back panel and the seat panel are unitary, the plastic foam of both the seat panel and back panel being continuous as are also each of the two facing sheets.

11. A cantilever seat as defined in claim 9 wherein the facing sheets of both panels are of aluminum.

12. A cantilever seat as defined in claim 11 wherein a generally L shape end closure member conforming to the shape defined by the ends of the facing sheets adjacent such vehicle wall is fitted between and securely connected to the facing sheets at such wall ends thereof.

* * * * *